Aug. 2, 1966   O. R. WEBER   3,263,393
METHOD AND APPARATUS FOR SECURING A COVER MEMBER TO
A CONTAINER HAVING A PERIPHERAL FLANGE
Filed Oct. 8, 1962   9 Sheets-Sheet 1
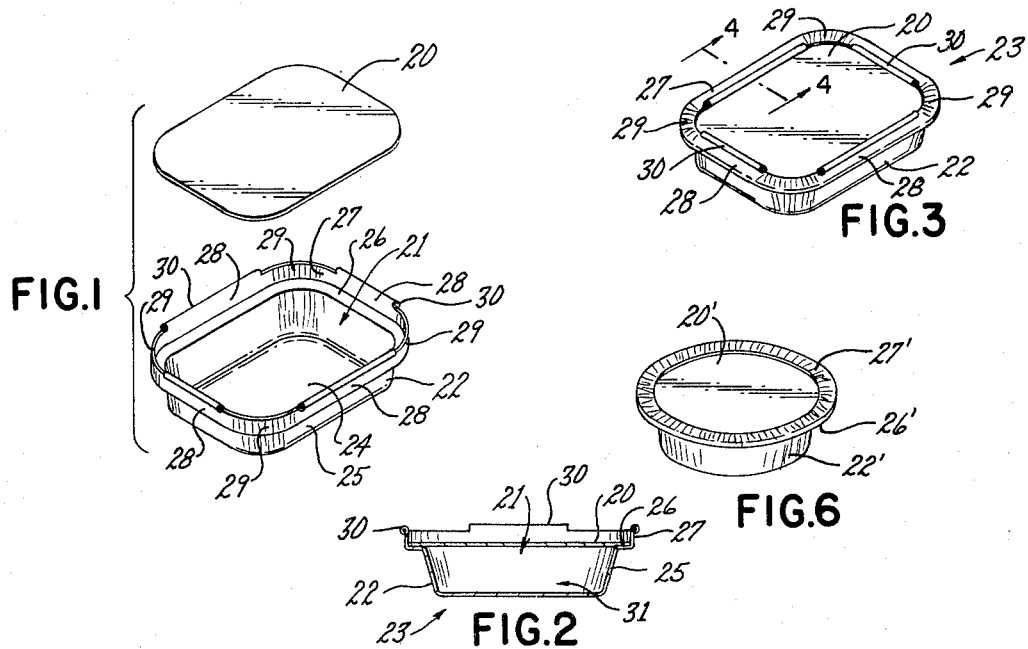
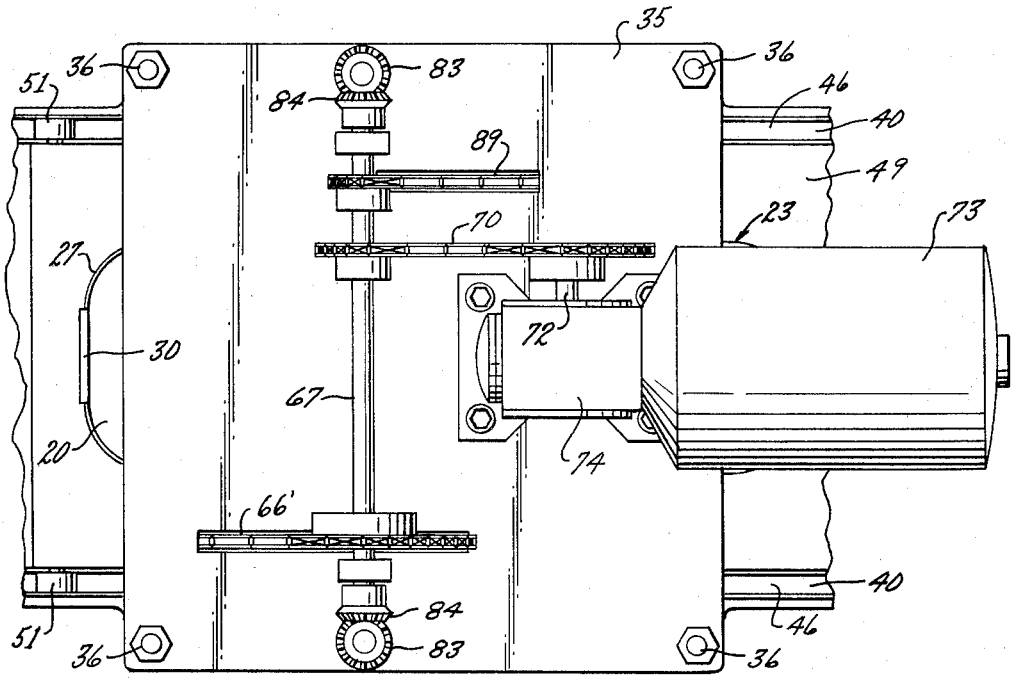
INVENTOR
OTTO R. WEBER
BY Glenn, Palmer
& Matthews
HIS ATTORNEYS Aug. 2, 1966                O. R. WEBER                3,263,393
   METHOD AND APPARATUS FOR SECURING A COVER MEMBER TO
           A CONTAINER HAVING A PERIPHERAL FLANGE
Filed Oct. 8, 1962                              9 Sheets-Sheet 2

INVENTOR
OTTO R. WEBER

BY *Glenn, Palmer*
   *& Matthews*
HIS ATTORNEYS

Aug. 2, 1966   O. R. WEBER   3,263,393
METHOD AND APPARATUS FOR SECURING A COVER MEMBER TO
A CONTAINER HAVING A PERIPHERAL FLANGE
Filed Oct. 8, 1962   9 Sheets-Sheet 3
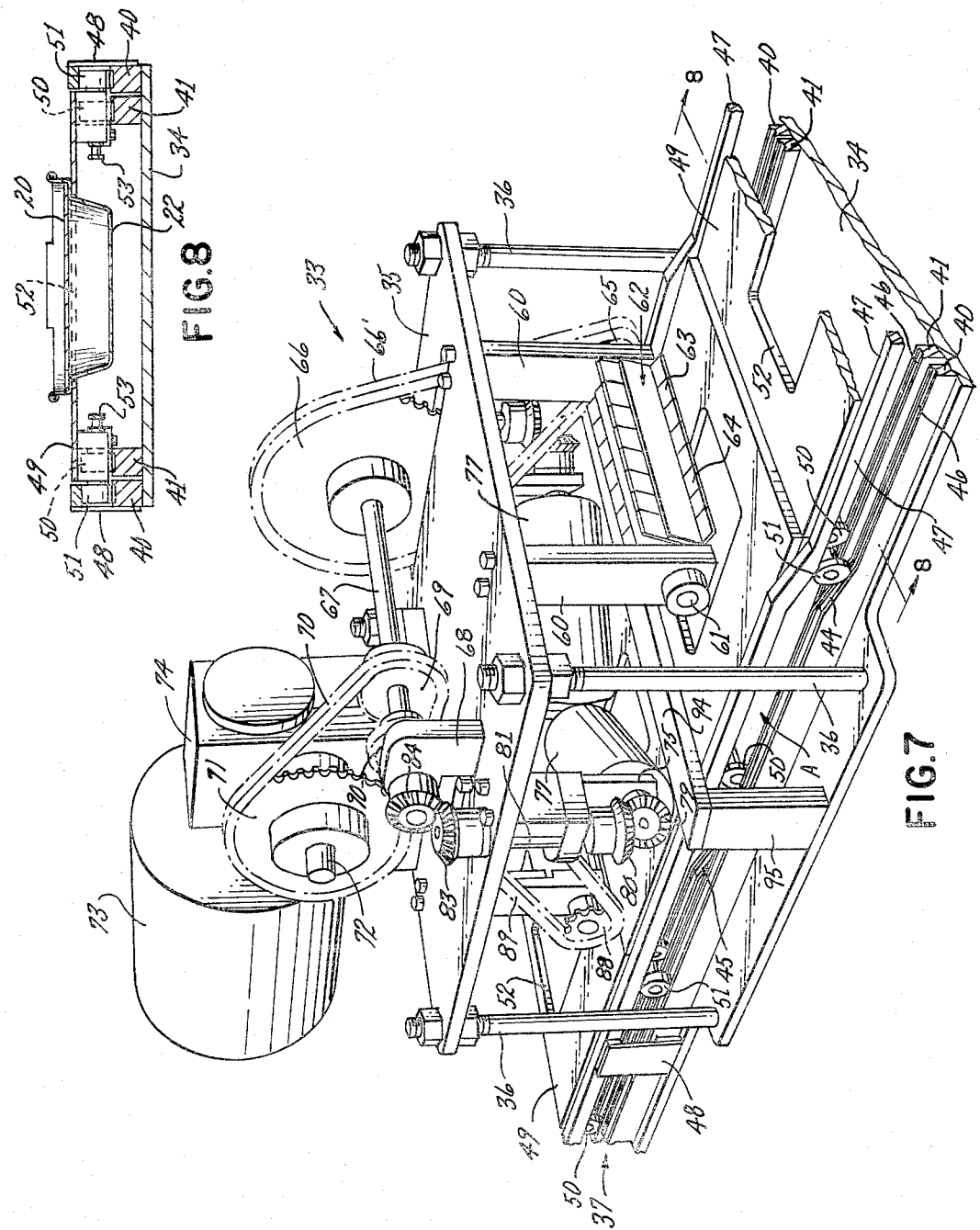
INVENTOR
OTTO R. WEBER
BY *Glenn, Palmer & Matthews*
HIS ATTORNEYS

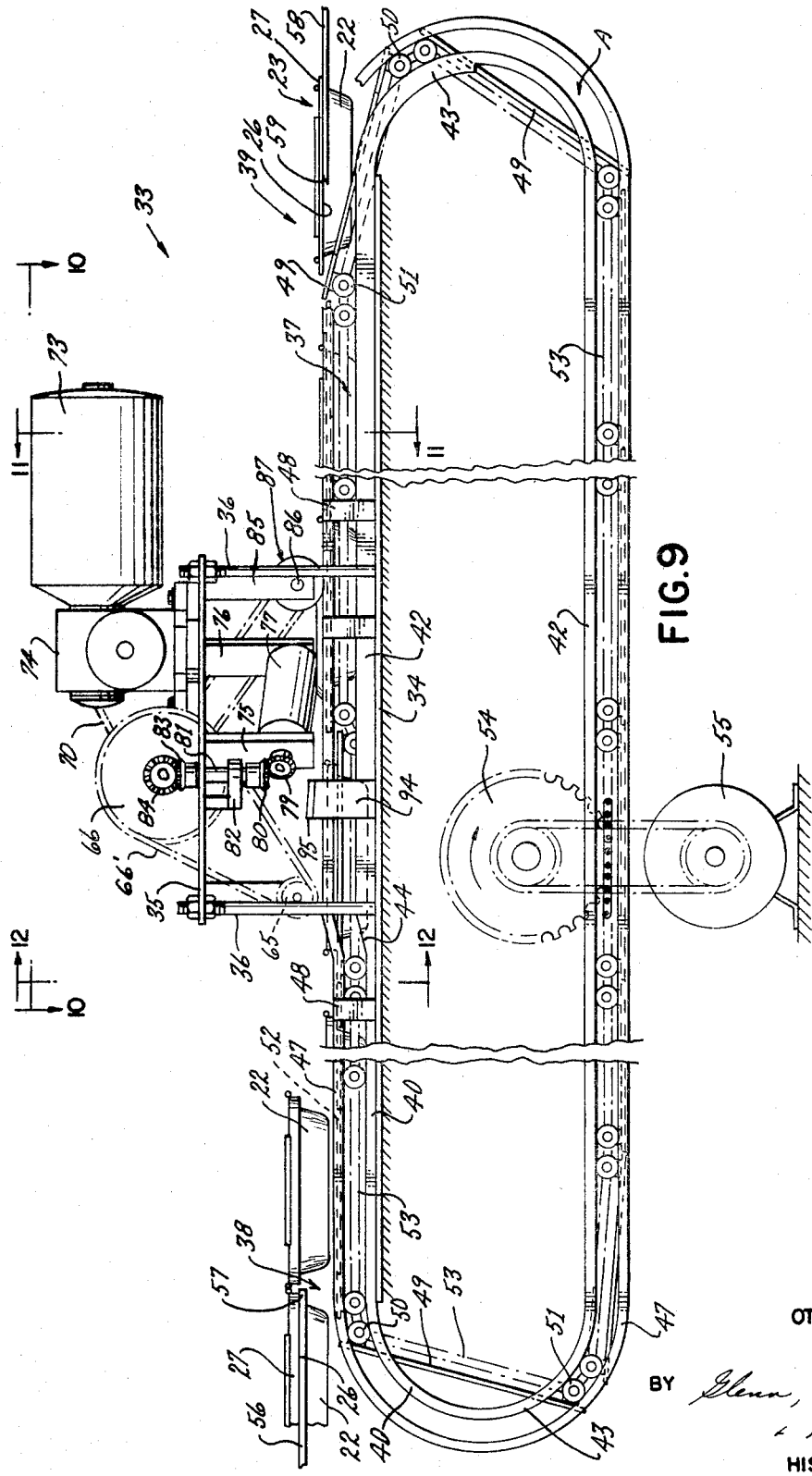

Aug. 2, 1966     O. R. WEBER     3,263,393
METHOD AND APPARATUS FOR SECURING A COVER MEMBER TO
A CONTAINER HAVING A PERIPHERAL FLANGE
Filed Oct. 8, 1962     9 Sheets-Sheet 5
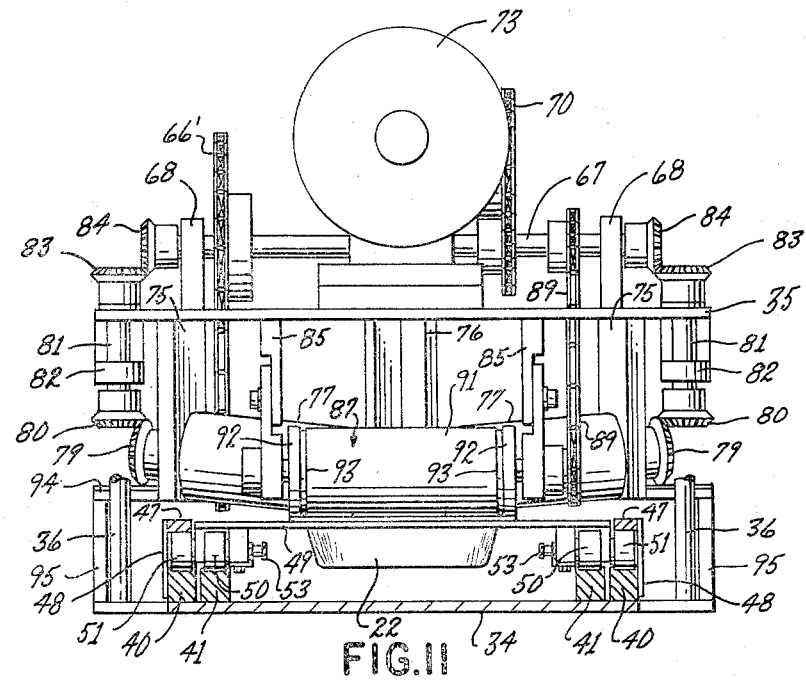
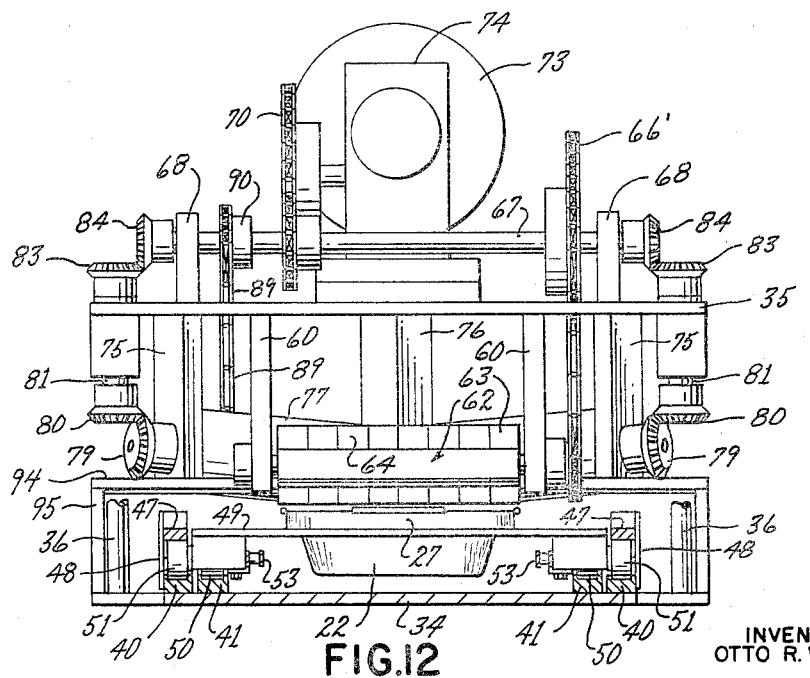
INVENTOR
OTTO R. WEBER
BY
HIS ATTORNEYS

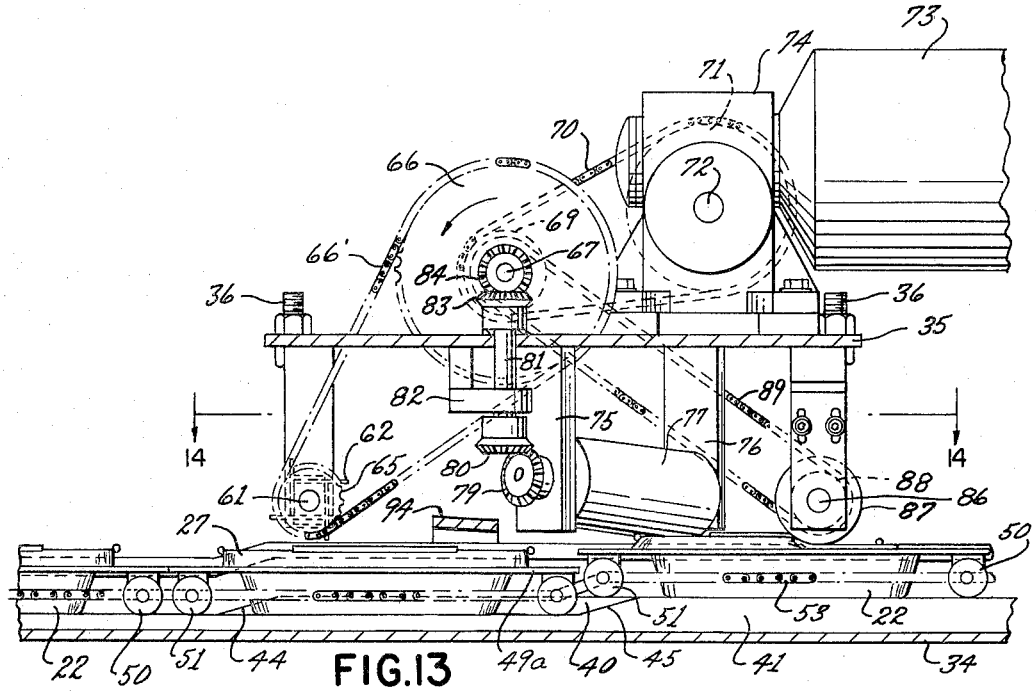

INVENTOR
OTTO R. WEBER

HIS ATTORNEYS

INVENTOR
OTTO R. WEBER

BY *Glenn, Palmer & Matthews*

HIS ATTORNEYS

Aug. 2, 1966  O. R. WEBER  3,263,393
METHOD AND APPARATUS FOR SECURING A COVER MEMBER TO
A CONTAINER HAVING A PERIPHERAL FLANGE
Filed Oct. 8, 1962  9 Sheets-Sheet 9

INVENTOR
OTTO R. WEBER

BY Glenn, Palmer
& Matthews
HIS ATTORNEYS

United States Patent Office 3,263,393
Patented August 2, 1966

3,263,393
METHOD AND APPARATUS FOR SECURING A COVER MEMBER TO A CONTAINER HAVING A PERIPHERAL FLANGE
Otto R. Weber, Henrico County, Va., assignor to Reynolds Metals Company, Richmond, Va., a corporation of Delaware
Filed Oct. 8, 1962, Ser. No. 228,907
53 Claims. (Cl. 53—40)

This invention relates to an improved method and apparatus for securing a cover member to an opened end of a container or the like.

One form of container construction to which this invention is applicable comprises a container having an opened end surrounded by an outwardly direct, substantially horizontal flange having a free end thereof integrally interconnected to an upwardly extending peripheral flange.

A substantially flat cover member is adapted to be placed on the horizontal flange of the container to enclose the desired product in the container.

Thereafter, the peripheral flange is bent inwardly over the cover member to hold the cover member on the horizontal flange of the container to complete the container construction.

One feature of this invention is to provide an improved method and apparatus for securing such a cover member to such a container while the container and assembled cover member are continuously moving in one direction.

Accordingly, it is an object of this invention to provide an improved method for securing a cover member to a container or the like, the method of this invention having one or more of the novel features set forth above or hereinafter shown or described.

Another object of this invention is to provide an improved apparatus for securing a cover member to a container or the like, the apparatus of this invention having one or more of the novel features set forth above or hereinafter shown or described.

Other objects, uses and advantages of this invention are apparent from a reading of this description which proceeds with reference to the accompanying drawings forming a part thereof and wherein:

FIGURE 1 is an exploded, perspective view of the cover member and container of this invention.

FIGURE 2 is a medial cross-sectional view of the assembled cover member and container of FIGURE 1.

FIGURE 3 is a perspective view illustrating the cover member of FIGURE 1 firmly secured to the container of FIGURE 1.

FIGURE 6 is a perspective view similar to FIGURE 3 illustrating another type of container and cover member of this invention.

FIGURE 7 is a fragmentary perspective view illustrating one embodiment of the method and apparatus of this invention.

FIGURE 8 is a fragmentary cross-sectional view taken on line 8—8 of FIGURE 7.

FIGURE 9 is a side view of the apparatus of this invention.

FIGURE 10 is a fragmentary top view of the apparatus illustrated in FIGURE 9 and is taken on line 10—10 thereof.

FIGURE 11 is a front end view of the apparatus illustrated in FIGURE 9 and is taken on line 11—11 thereof.

FIGURE 12 is a rear end view of the apparatus illustrated in FIGURE 9 and is taken on line 12—12 thereof.

FIGURE 13 is an enlarged, fragmentary, side view of the apparatus illustrated in FIGURE 9.

FIGURE 14 is a fragmentary cross-sectional view taken on line 14—14 of FIGURE 13.

Figure 18:
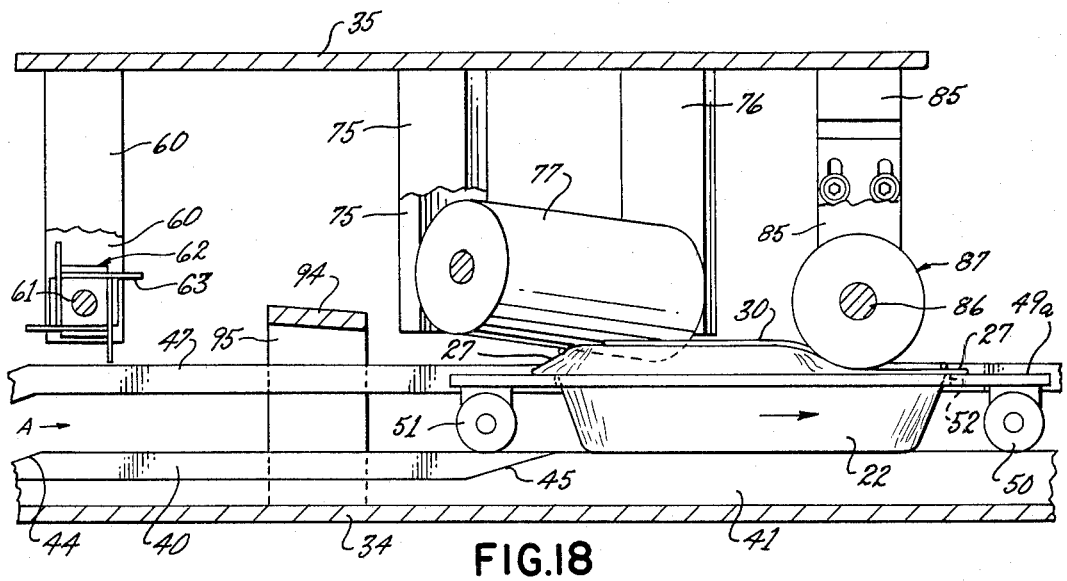
FIGURE 18 is a view similar to FIGURE 15 and illustrates the apparatus in another operating position thereof.

While the various features of this invention are hereinafter described as being particularly adaptable for securing a cover member to a container or the like, it is to be understood that the various features of this invention can be utilized singly or in any combination thereof to provide other constructions as desired.

Therefore, this invention is not to be limited only to the embodiments illustrated in the drawings, because the drawings are merely utilized to illustrate one of the wide variety of uses of this invention.

Referring now to FIGURES 1-5, the method and apparatus of this invention, later to be described, are particularly adaptable for securing a substantially flat cover member 20 to an opened end 21 of a container 22 to complete the container construction 23 as illustrated in FIGURE 3.

The container 22 has a substantially rectangular bottom wall 24 integrally interconnected to an upwardly extending side wall means 25 that terminate at the opened end 21 of the container 22.

A continuous, substantially horizontal flange 26 extends outwardly from the free end of the side wall means 25 and is integrally interconnected therewith, the horizontal flange 26 having its free end integrally interconnected to a continuous peripheral flange 27 initially extending substantially vertically upwardly from the horizontal flange 26.

The continuous peripheral flange 27 of the container 22 has a plurality of straight portions 28 integrally interconnected to arcuate corner portions 29, the straight portions 28 terminating in reversely turned bead-like portions 30 for a purpose hereinafter described.

While the container 22 can be formed in any suitable manner and of any suitable material, the embodiment thereof illustrated in the drawings comprises metallic foil, such as aluminum-containing metallic foil or the like, suitably stamped and drawn into the configuration illustrated in FIGURE 1 from a substantially flat blank of material.

The cover member 20 is so constructed and arranged that the same is adapted to be placed vertically downwardly on the container 22 in the manner illustrated in FIGURE 2 whereby the peripheral edge of the cover member 20 rests on top of the horizontal flange 26 closely adjacent the upstanding peripheral flange 27 to close a compartment 31 in the container construction 23 which is adapted to receive the desired product before the cover member 20 is placed thereon in the position illustrated in FIGURE 2.

While the cover member 20 can be formed in any suitable manner and of any suitable material, the embodiment thereof illustrated in the drawings comprises cardboard or the like either remaining plain or having metallic foil laminated thereto as desired.

The apparatus and method of this invention are adapted to bend inwardly the peripheral flange 27 of the container 22 from the position illustrated in FIGURE 2 over the cover member 20 in the manner illustrated in FIGURE 3 to secure the cover member 20 to the container 22.

Figure 4:
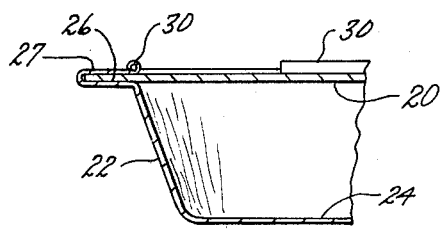
FIGURE 4 is an enlarged, fragmentary, cross-sectional view taken on line 4—4 of FIGURE 3.

In particular, reference is made to FIGURE 4 wherein it can be seen that the peripheral edge of the cover member 20 is secured between the bent inwardly peripheral flange 27 and the horizontal flange 26 to firmly secure the cover member 20 to the container 22 until the ultimate consumer desires to open the same.

Figure 5:
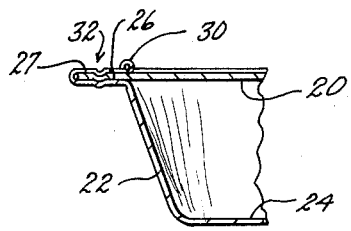
FIGURE 5 is a view similar to FIGURE 4 illustrating another embodiment of this invention.

If desired, the peripheral flange 27 and the horizontal flange 26 of the container 22 can be crimped to the cover member 20 in the manner illustrated in FIGURE 5 by forming a groove 32 in the peripheral flange 27 while backing up the undersurface of the horizontal flange 26 in any suitable manner.

When the ultimate consumer desires to open the container construction 23, the beads 30 of the peripheral flange 27 are grasped and peeled upwardly and outwardly to move the peripheral flange 27 to substantially the position illustrated in FIGURE 2 whereby the cover member 20 can be lifted from the container 22 to permit the product to be dispensed out of the opened end 21 of the container 22.

While the method and apparatus of this invention are hereinafter described as being utilized to secure the cover member 20 to the container 22, it is to be understood that the method and apparatus of this invention can also be utilized to secure a cover member to a container having a configuration other than a rectangular configuration as illustrated in FIGURE 1.

In particular, reference is made to FIGURE 6 wherein a substantially circular container 22' has a substantially circular cover member 20' secured thereto by bending inwardly the continuous peripheral flange 27' of the container 22' over the cover member 20' to secure the cover member 20' between the peripheral flange 27' and a horizontal flange 26' of the container 22' in a manner hereinafter described.

The method and apparatus of this invention will now be described and reference is made to FIGURES 7 and 9 wherein the apparatus of this invention is generally indicated by the reference numeral 33.

The apparatus 33 includes a substantially horizontally disposed lower support plate or member 34 adapted to be supported in the position illustrated in the drawings in any suitable manner, the lower support plate 34 supporting an upper, substantially horizontal support plate 35 in spaced relation relative thereto by a plurality of post structures 36.

The lower support plate 34 carries a conveyor means 37, later to be described, adapted to continuously receive assembled containers 22 and cover members 20 at the point 38 and continuously convey the same in one direction to a point 39 where the containers 22 and assembled cover members 20 are continuously removed from the conveyor means 37.

The upper support plate 35 carries means in a manner hereinafter described to bend inwardly the peripheral flange 27 of each container 22 over the assembled cover member 20 in the manner previously described at a point intermediate the points 38 and 39 on the conveyor means 37 to complete the container constructions 23.

As illustrated in FIGURES 7 and 9, the conveyor means 37 includes two pairs of continuous tracks 40 and 41 with the tracks 40 being disposed parallel to and in space relation relative to each other with the tracks 41 disposed inside of the pair of tracks 40 and disposed closely adjacent thereto to provide inner tracks for a purpose hereinafter described.

The tracks 40 and 41 have substantially straight portions 42 disposed on opposite sides of the lower support plate 34 and interconnected together by arcuate portions 43, the upper straight courses 42 of the tracks 40 and 41 being secured to the lower support plate 34 in any suitable manner.

The upper straight courses 42 of the tracks 40 and 41 are so constructed and arranged that each track 40 has an upwardly directed angular portion 44 and each inner track 41 has a like upwardly directed angular portion 45 disposed remote from the portions 44 of the tracks 40 for a purpose hereinafter described, the raised portions 44 and 45 of the tracks 40 and 41 being properly located relative to the upper support plate 35 for a purpose hereinafter described.

If desired, the tracks 40 and 41 can have the outer free surfaces thereof suitable grooved at 46 to receive rollers in a manner hereinafter described.

An outer rail 47 is operatively associated with each outer track 40 and is held in spaced relation thereto by support means 48 whereby the outer rails 47 cooperate with the outer tracks 40 to define a space A therebetween.

The conveyor means 37 also includes a plurality of container conveying plates 49 each having a pair of front rollers 50 respectively disposed on the inner tracks 41 and a pair of rear rollers 51 respectively disposed on the outer tracks 40 in the space A between the tracks 40 and the outer rails 47 whereby each conveyor plate 49 is held to the apparatus 33.

Each conveyor plate 49 has a substantially rectangular opening 52, FIGURES 7 and 8, formed substantially centrally therethrough and constructed of a size to permit a container 22 to be received therein and have the undersurface of the horizontal flange 26 thereof rest on the conveyor plate 49 in the position illustrated in FIGURE 8 so that the container 22 is suspended from the conveyor plate 49 by the horizontal flange 26 thereof.

The conveyor plates 49 are closely disposed adjacent each other about the conveyor means 37 and are respectively interconnected to continuous drive chains 53 in any suitable manner, the drive chains 53 being disposed in meshing relation with drive gears 54 driven by a suitable power means 55, such as an electrical motor or the like.

In this manner, movement of the drive gears 54 in the direction indicated by the arrow in FIGURE 9 causes the conveyor plates 49 to be continuously moved from the point 38 along the tracks 40 and 41 to the point 39 whereby the direction of movement of the plate-like members 49 is reversed by the arcuate end portion 43 so that the plates 49 can be returned back to the point 38 in a continuous manner.

As illustrated in FIGURE 9, the assembled containers 22 and cover members 20 are fed to the conveyor means 37 at the point 38 by having each container 22 span the space between a pair of rails 56 so that the horizontal flange 26 thereof rides on the rails 56, the rails 56 being so constructed and arranged that each container 22 and assembled cover member 20 is adapted to be pushed off the free ends 57 of the rails 56 in the proper timed sequence to cause the container 22 and assembled cover member 20 to drop into the opening 52 of a conveyor plate 49 properly positioned relative thereto.

The completed container constructions 23 are adapted to be continuously removed from the conveyor means 37 at the point 39 by having each conveyor plate 49 convey the completed container construction 23 to a pair of rails 58 having free ends 59 that cam between the conveyor plates 49 and the horizontal flanges 26 of the container constructions 23 to permit the container constructions 23 to slide to the right on the rails 58 as additional container constructions 23 are moved to the right at the station 39 by the conveyor means 37.

Therefore, it can be seen that the apparatus 33 of this invention is adapted to be continuously fed assembled containers 22 and cover members 20 by the rails 56 at the station or point 38 and have the same continuously conveyed in one direction from the station 38 to the station or point 39 by the conveyor means 37 where the completed container constructions 23 are continuously removed from the conveyor means 37 by the rails 58.

As the assembled containers 22 and cover members 20 proceed from the point 38 to the point 39 along the conveyor means 37, the apparatus 33 of this invention continuously bends inwardly the peripheral flanges 27 thereof to firmly secure the cover members 20 to the containers 22 in a manner now to be described.

As illustrated in FIGURES 7 and 12, a pair of support members 60 extend downwardly from the upper support plate 35 and rotatably carry a shaft 61 therebetween, the shaft 61 being fixedly secured to a paddle wheel member 62 disposed between the supports 60 and carrying a plurality of outwardly directed paddles 63.

As illustrated in the drawings, each paddle 63 is formed from a plurality of finger-like members 64 to function in a manner hereinafter described.

The shaft 61 of the paddle wheel 62 carries a gear 65 disposed outboard of one of the support members 60 as illustrated in FIGURES 7 and 13, the gear 65 being disposed in meshing relation with a continuous drive chain 66' looped about the gear 65 and a larger gear 66 carried on a shaft 67 rotatably supported above the upper support plate 35 by journal means 68.

The shaft 67 carries a gear 69 intermediate the ends thereof and disposed in meshing relation with a drive chain 70 looped around the gear 69 and around a larger gear 71 carried on a drive shaft 72.

The drive shaft 72 is driven by a suitable power source 73, such as an electric motor or the like, carried on the upper support 35 in any suitable manner and interconnected to the drive shaft 72 through a gear box 74 to provide the desired rotational speed of the shaft 72.

In this manner, the power source 73 is adapted to continuously rotate the paddle wheel 62 in a counterclockwise direction as illustrated in FIGURE 13 for a purpose hereinafter described.

As illustrated in FIGURES 9 and 14, a pair of outer support members 75 are suspended from the upper support plate 35 and are angularly disposed relative to a substantially V-shaped support member 76 also suspended from the upper support plate 35.

A pair of rolls 77 are respectively rotatably mounted between the outer support members 75 and the central support member 76 in the manner illustrated in FIGURE 14, the rolls 77 being fixedly secured to a pair of rotatably mounted shafts 78 having their axes converging toward the center of the apparatus 33 and angularly disposed relative to the horizontal as illustrated in FIGURES 9 and 13 for a purpose hereinafter described.

Each shaft 78 of the rollers 77 has a beveled gear 79 secured on the free end thereof and disposed in meshing relation with a beveled gear 80 carried on a shaft 81 suitably journaled at 82 to the upper support plate 35 and projecting upwardly through a suitable aperture passing therethrough.

Each shaft 81 has a beveled gear 83 on the upper end thereof and disposed in meshing relation with a beveled gear 84 carried on the respective end of the shaft 67 whereby the rolls 77 are continuously driven in a clockwise direction as illustrated in FIGURE 9 by power source 73 for a purpose hereinafter described.

As illustrated in FIGURES 9 and 14, a pair of support members 85 are suspended from the upper support plate 35 and rotatably carry a shaft 86 therebetween, the shaft 86 having a roller 87 affixed thereto for a purpose hereinafter described.

The shaft 86 carries a gear 88 mounted outboard of one of the support members 85 and disposed in meshing relation with a continuous drive chain 89 looped around the gear 88 and another gear 90 carried on the shaft 67.

In this manner, the power source 73 continuously rotates the roller 87 in a counterclockwise direction as viewed in FIGURES 9 and 13.

The roller 87 has a reduced central portion 91 having a diameter smaller than the diameters of the opposed end portions 92 thereof for a purpose hereinafter described, the end portions 92 of the roller 87 being separated from the reduced central portion 91 thereof by annular grooves 93 for a purpose hereinafter described.

If desired, the roll 87 could be formed of various segments to form the parts 87, 93 and 92 thereof, whereby the roller 87 could be adapted to operate on containers of different size by merely changing the appropriate part or parts thereof.

Further, the supports 85 of the roller 87 are adjustable relative to the upper support plate 35 to permit the roller 87 to operate on containers of different size.

The operation of the apparatus 33 of this invention will now be described.

As illustrated in FIGURE 9, the containers 22 and assembled cover members 20 are continuously fed to the conveyor plates 49 at the station point 38, whereby the plate-like members 49 continue to move to the right toward the upper support plate 35.

The tracks 40 and 41 have the raised portions 44 and 45 thereof so constructed and arranged that it can be seen in FIGURE 13 that the plate-like member 49a partially passes under the paddle wheel 62 without having the paddles 63 engage the upstanding peripheral flange 27 of the respective container 22.

Figure 15:
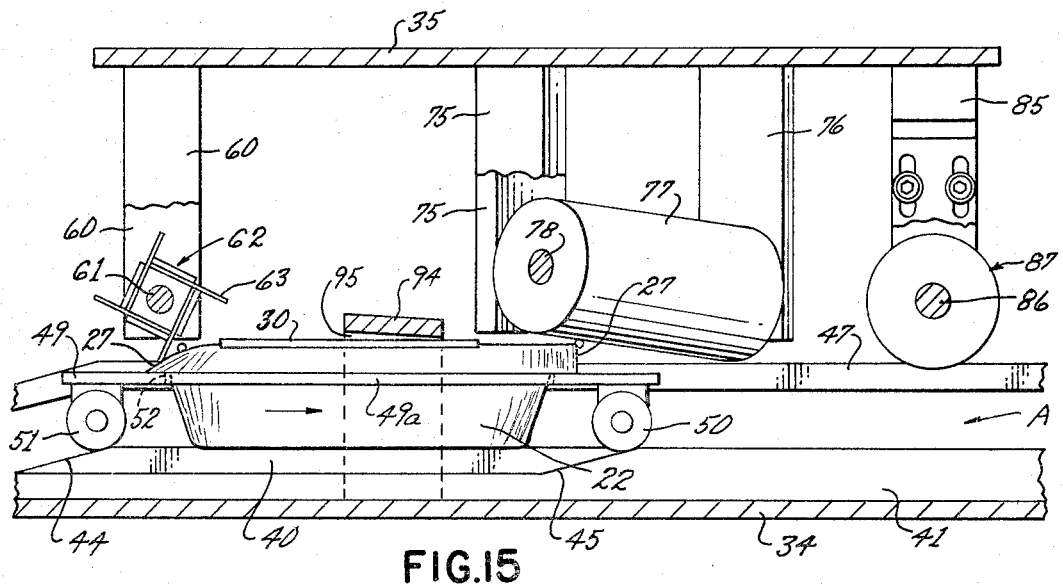
FIGURE 15 is a schematic side view similar to FIGURE 13 illustrating the apparatus of this invention in one operating position thereof.

However, before that respective container 22 passes completely under the paddle wheel 62, the front rollers 50 and the rear rollers 51 of the conveyor plate 49a begin to ride up the raised portions 44 and 45 of the tracks 40 and 41 in the manner illustrated in FIGURE 15, whereby at least one of the paddles 63 of the paddle wheel 62 rotating in a counterclockwise direction engages against the trailing portion of the peripheral flange 27 and bends the same inwardly over the cover member 20 in the manner illustrated in FIGURE 15.

Since during the operation of the paddle wheel 62 in bending inwardly the trailing portion of the peripheral flange 27 of the container 22, the paddle wheel 62 tends to kick the container 22 upwardly out of the opening 52 in the conveyor plate 49a, a substantially horizontal cross bar 94 is disposed over the upper rail 47 and is interconnected to the lower support plate 34 by support members 95, the cross bar 94 being substantially angularly disposed relative to the horizontal to permit relative movement of the container 22 upwardly when engaged by the paddle wheel 62 but preventing displacement of the container 22 out of the aperture or opening 52 of the conveyor plate 49a.

Therefore, it can be seen that the paddle wheel 62 bends inwardly the trailing portion of the peripheral flange 27 of the container 22 while the container 22 is being continuously moved in one direction from the station 38 to the station 39.

Figure 16:
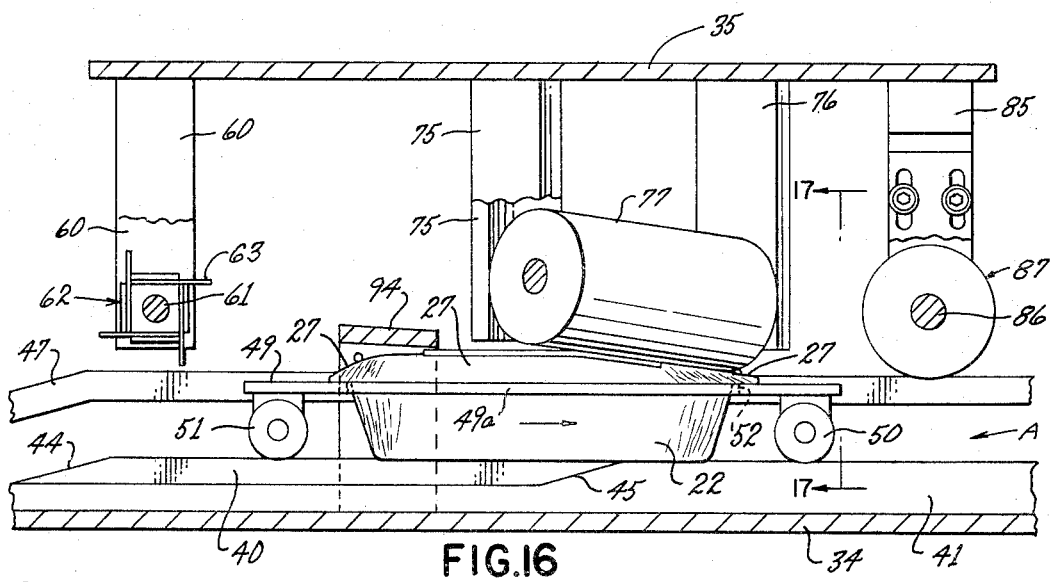
FIGURE 16 is a view similar to FIGURE 15 and illustrates the apparatus in another operating position thereof.
Figure 17:
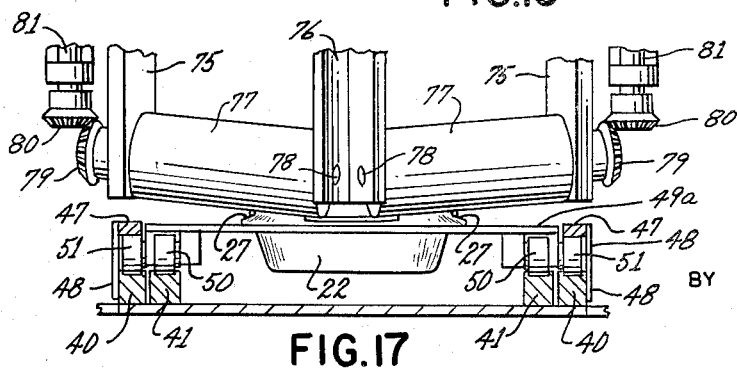
FIGURE 17 is a cross-sectional view taken on line 17—17 of FIGURE 16.

After the paddle wheel 62 has performed its function, the leading portion of the peripheral flange 27 comes into engagement with the rollers 77 in the manner illustrated in FIGURES 16 and 17, whereby the rollers 77 bend inwardly the leading portion of the peripheral flange 27 as well as the side portions thereof as the container 22 passes below the rollers 77.

In addition, the rollers 77 may further bend downwardly the trailing portion of the peripheral flange 27 as the same passes therebeneath should the paddle wheel 62 not bend the same inwardly to too great an extent.

However, it can be seen that the rollers 77 and paddle wheel 62 do not bend the peripheral flange 27 completely flush against the cover member 20 in the manner illustrated in FIGURE 4.

Therefore, the roller 87 completes the folding in of the periheral flange 27 in the manner illustrated in FIGURE 18 as the particular container 22 passes therebeneath, whereby the central reduced portion 91 of the roller 87 completely bends inwardly the leading portion of the peripheral flange 27 over the cover member 20 while without substantially flattening the bead 30 thereof.

The outer end portions 92 of the roller 87 are so constructed and arranged that the same span the side portions of the peripheral flange 27 in the manner illustrated in FIGURES 14 and 18 to completely compress the side portions of the peripheral flange 27 down against the cover member 20 to produce the construction illustrated in FIGURE 4, the grooves 93 of the roller 87 receiving the side beads 30 of the container 22 to prevent flattening thereof.

As the container 22 passes under the roller 87, the trailing portion of the peripheral flange 27 is bent downwardly against the cover member 20 by the roller 87 in substantially the same manner as the leading portion thereof previously described.

Therefore, it can be seen that the means 62, 77 and 87 cooperate together to completely bend inwardly the peripheral flange 27 of a container 22 over the assembled cover member 20 as the container 22 continuously passes from the point 38 to the point 39 to produce a completed container construction 23.

Thereafter, the completed container construction 23 is removed from the conveyor means 37 at the point 39 by the rails 58 in the manner previously described so that the particular conveyor plate 49a can be returned by the tracks 40 and 41 back to the point 38 to receive another assembled container and cover member.

Therefore, it can be seen that this invention provides an improved method and apparatus for securing a cover membr to a container while the assembled cover member and container are continuously moving in one direction without requiring a stopping of movement of the container whereby a greater number of container constructions can be produced by the method and apparatus of this invention.

For example, it is believed that the apparatus 33 can supply between 25 to 200 container constructions 23 per minute.

Should it be desired to form the grooves 32 along the side portions of the peripheral flanges 27 of the container constructions 23 in the manner illustrated in FIGURE 5, it can be seen that the end portions 92 of the roller 87 can be provided with annular beads therearound to produce the grooves 32 as the particular container 22 passes beneath the same as the particular conveyor plate 49 acts as an anvil in backing up the undersurface of the horizontal flange 26 thereof.

Further, while only one particular embodiment of the conveyor means 37 has been illustrated and described above, it is to be understood that other conveyor means can be utilized as well as other feeding means 52 and removing means 58 as desired, such means being illustrated in the drawings as merely being exemplary of the various types that can be utilized.

Figure 19:
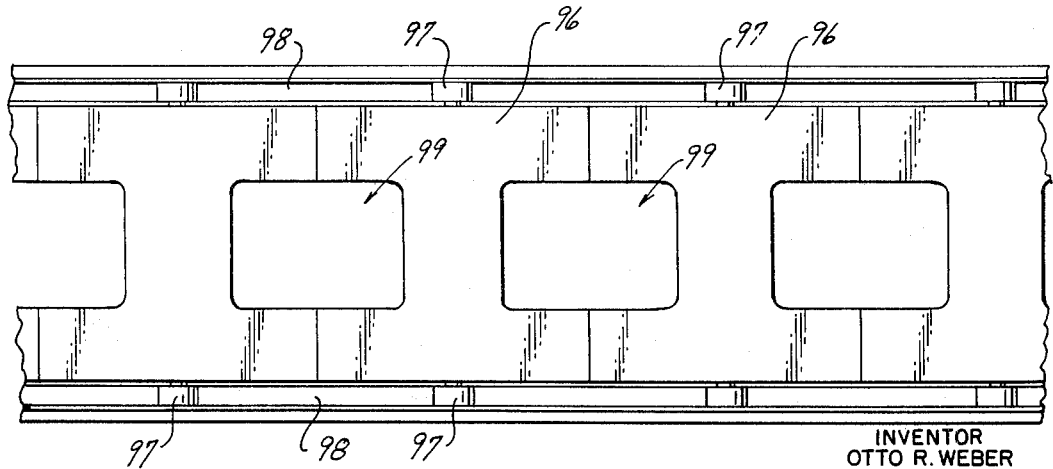
FIGURE 19 is a fragmentary top view illustrating another conveyor means of this invention.

For example, the conveying means can be constructed in the manner illustrated in FIGURE 19 wherein a plurality of plate-like members 96 are substantially H-shaped and have rollers 97 extending therefrom to ride on tracks 98 in the manner previously described.

Each adjacent pair of H-shaped plate-like members 96 cooperates together to define a substantially rectangular opening 99 therebetween to receive a container 22 in substantially the same manner as the opening 52 of the conveyor plates 49.

Figure 20:
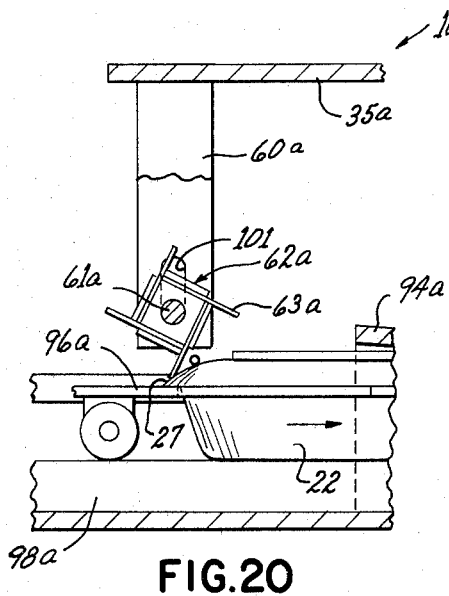
FIGURE 20 is a fragmentary, schematic, side view similar to FIGURE 18 and illustrates another embodiment of this invention.
Figure 21:
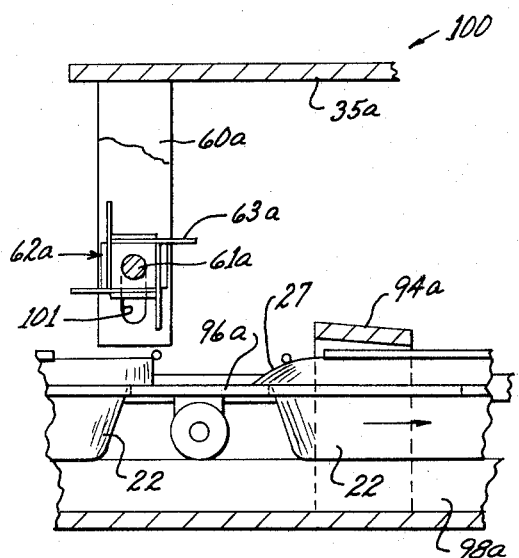
FIGURE 21 is a view similar to FIGURE 20 and illustrates the apparatus of FIGURE 20 in another operating position thereof.

Another apparatus of this invention is generally indicated by the reference numeral 100 in FIGURES 20 and 21 and the parts thereof similar to the apparatus 33 previously described are indicated by like reference numerals followed by the reference letter "a."

The paddle wheel 62a of the apparatus 100 is mounted for reciprocating vertical movement on the support means 60a depending on the upper plate 35a, the shaft 61a of the paddle wheel 62a being adapted to reciprocate in a longitudinal slot 101 formed in the support 60a while still being rotated in a counterclockwise direction relative to the support means 60a.

In this manner, the conveying means for conveying the containers 22 and their assembled cover members 20 from the left to the right to the apparatus 100 can comprise substantially straight track means 98a and conveyor plates 96a similar to the plates 96 illustrated in FIGURE 19.

Thus, the track means 98a can convey the containers 22 in a straight line through the apparatus 100 without requiring transverse movement of the container 22 relative to the conveying direction as provided by the cam means 44 and 45 of the track means 40 and 41 previously described whereby a high speed operation for bending or folding inwardly the peripheral flanges 27 of the containers 22 can be effected without jostling of the food in the containers 22 which might cause the same to spill out of the containers 22 if the same were moved vertically upwardly at too fast a rate by the track means 40 and 41 previously described.

The operation of the apparatus 100 will now be described.

As illustrated in FIGURE 21, the left-hand container 22 is being conveyed from the left to the right by the conyeyor plates 96a in a straight line through the apparatus 100 and the rotating paddle wheel means 62a has been reciprocated vertically upwardly relative to the support means 60a in the manner illustrated in FIGURE 21 to permit the leading portion of the peripheral flange 27 of the left-hand container 22 to move past the rotating paddle wheel 62a.

However, as the trailing portion of the peripheral flange 27 of the container 22 comes into alignment with the rotating paddle wheel 62a, the rotating paddle wheel 62a is reciprocated vertically downwardly to the position illustrated in FIGURE 20 whereby the vanes 63a of the rotating paddle wheel 62a bend inwardly the trailing portion of the peripheral flange 27 of the container 22 in the manner illustrated in FIGURE 20.

As the next container 22 is being moved toward the rotating paddle wheel 62a, the rotating paddle wheel 62a is moved vertically upwardly in the manner illustrated in FIGURE 21 to permit the leading portion of the peripheral flange 27 of the next container 22 to pass under the same whereby it can be seen that the containers 22 can be moved in a straight line through the apparatus 100 because of the reciprocating paddle wheel means 62a.

While the paddle wheel means 62a has been described and illustrated as merely reciprocating vertically to permit the containers 22 to be moved in a straight line to the apparatus 100, it is to be understood that the paddle wheels 62a can be moved in any desired manner to permit the leading portion of the peripheral flange 27 of the container 22 to pass beyond the same and, thereafter, have the paddle wheel 62a move toward the container 22 to bend inwardly the trailing portion of the peripheral flange 27 of the container 22 whereby the remaining roller means 77 and 87 complete the bending inwardly of the peripheral flange 27 of the containers 22 over the assembled cover members 20 in the manner previously described.

Figure 22:
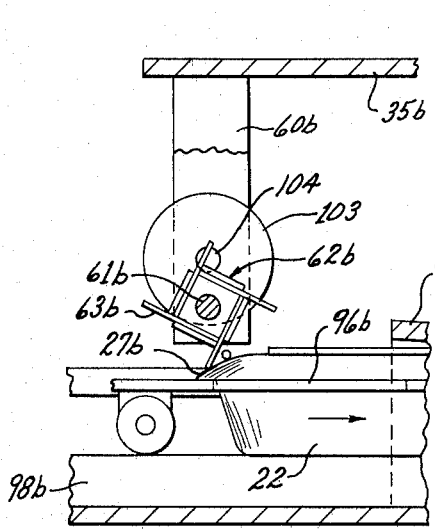
FIGURE 22 is a view similar to FIGURE 20 and illustrates another embodiment of this invention.
Figure 23:
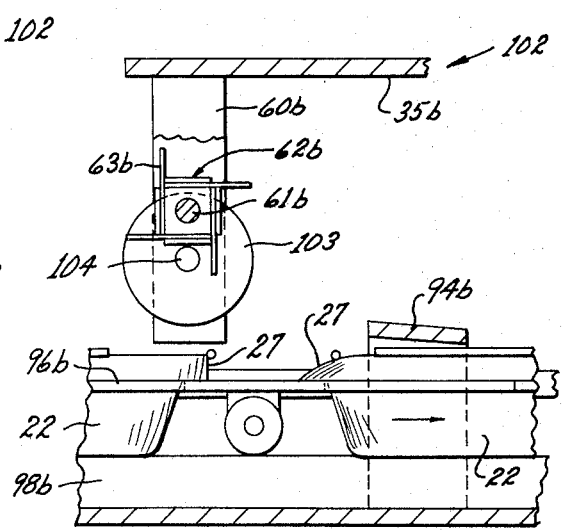
FIGURE 23 is a view similar to FIGURE 22 and illustrates the apparatus of FIGURE 22 in another operating position thereof.

For example, reference is made to FIGURES 22 and 23 wherein another apparatus of this invention is generally indicated by the reference numeral 102 and parts thereof similar to the apparatus 33 previously described are indicated by like reference numerals followed by the reference letter "b."

As illustrated in FIGURE 22, the rotatable paddle wheel means 62b is rotatably mounted in an eccentric manner to disc means 103 rotatably mounted to the vertical support means 60b by a rotatably driven shaft 104.

In this manner, the paddle wheel 62b is adapted to rotate about its substantially horizontally disposed axis 61b while the axis 61b of the paddle wheel 62b is being orbited about the axis 104 of the disc means 103 for a purpose now to be described.

As illustrated in FIGURE 23, the left-hand container 22 is moving from the left to the right by the conveyor plate 96b on the straight tracks 98b whereby the leading portion of the peripheral flange 27 of the container 22 is adapted to pass under the rotating paddle wheel 62b while the rotating paddle wheel 62b is in an upward position provided by the rotating disc means 103 so that the rotating paddle wheel 62b will not interfere with the leading portion of the peripheral flange 27 of the container 22.

However, as the particular container 22 has the trailing portion of the peripheral flange 27 moved under the support means 60b, the disc means 103 orbits the counterclockwise rotating paddle wheel means 62b to the position illustrated in FIGURE 22 whereby the vanes 63b of the rotating paddle wheel means 62b bend inwardly the trailing portion of the peripheral flange 27 of the container 22 in the manner illustrated in FIGURE 22 to permit the roller means 77 and 87 to complete the folding inwardly of the peripheral flange 27 of the container 22 over its assembled cover member 20 in the manner previously described.

Therefore, it can be seen that the apparatus 100 and 102 of this invention permit the containers 22 to be moved in a straight line through the apparatus 100 and 102 by the conveyor means 96a and 96b without requiring vertical movement of the containers 22 as provided by the cam surfaces 44 and 45 of the tracks 40 and 41 previously described.

Another apparatus of this invention for permitting the containers 22 to be moved in a straight line through the apparatus while the peripheral flanges 27 thereof are being folded inwardly over their assembled cover members 20 is generally indicated by the reference numeral 105 in FIGURES 24–27 and parts thereof similar to the apparatus 33 are indicated by like reference numerals followed by the reference letter "c."

Figure 24:
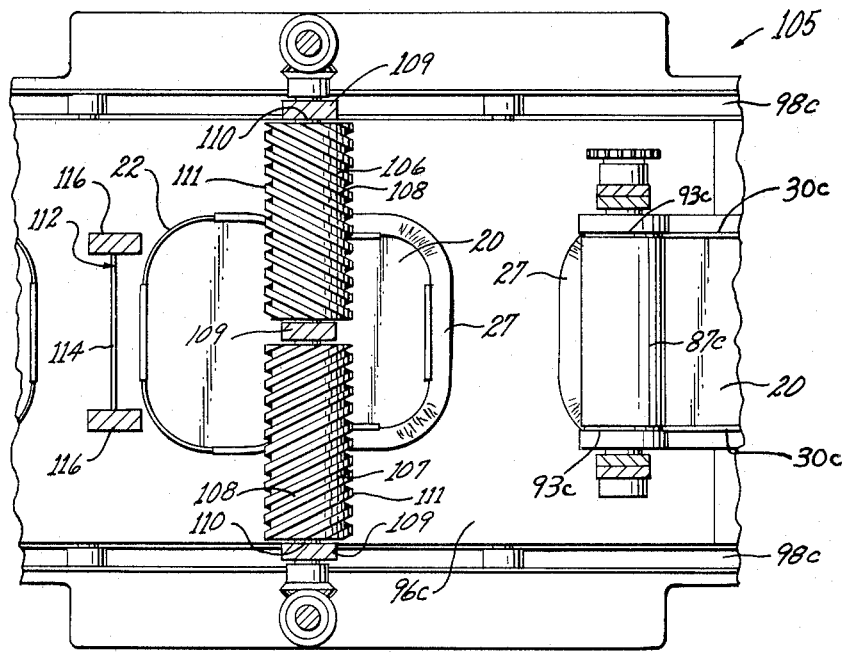
FIGURE 24 is a fragmentary, schematic, top view similar to FIGURE 14 and illustrates another embodiment of this invention.
Figure 25:
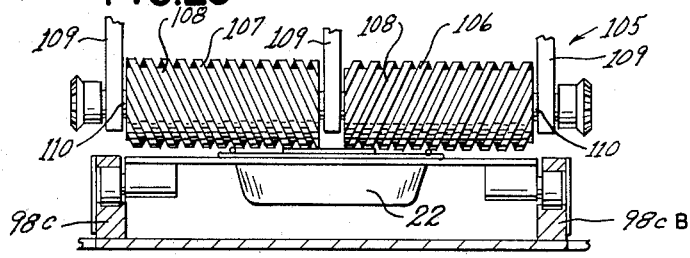
FIGURE 25 is a fragmentary, schematic, front view of the apparatus illustrated in FIGURE 24.

As illustrated in FIGURES 24 and 25, the paddle wheel means 62 and roller means 77 of the apparatus 33 have been eliminated while the roller means 87c have been retained and a pair of rotating screw members 106 and 107 have been substituted in place of the roller means 77 and accomplish the same function as the paddle wheel means 62 and roller means 77 previously described.

In particular, the rotatable screw means 106 and 107 each comprises a substantially cylindrical member 108 rotatably mounted between vertical support means 109 by stub shafts 110, the outer stub shafts 110 being adapted to be rotated in the manner previously described for the rollers 77.

The rotatable screw members 106 and 107 are rotatable about axes that are coaxially aligned and disposed substantially horizontal as illustrated in FIGURES 24 and 25.

The rotatable screw members 106 and 107 have threads 111 helically wound around the same and move progressively inwardly as the screw members 106 and 107 are rotated in a counterclockwise direction for a purpose hereinafter described.

Figures 26, 27:
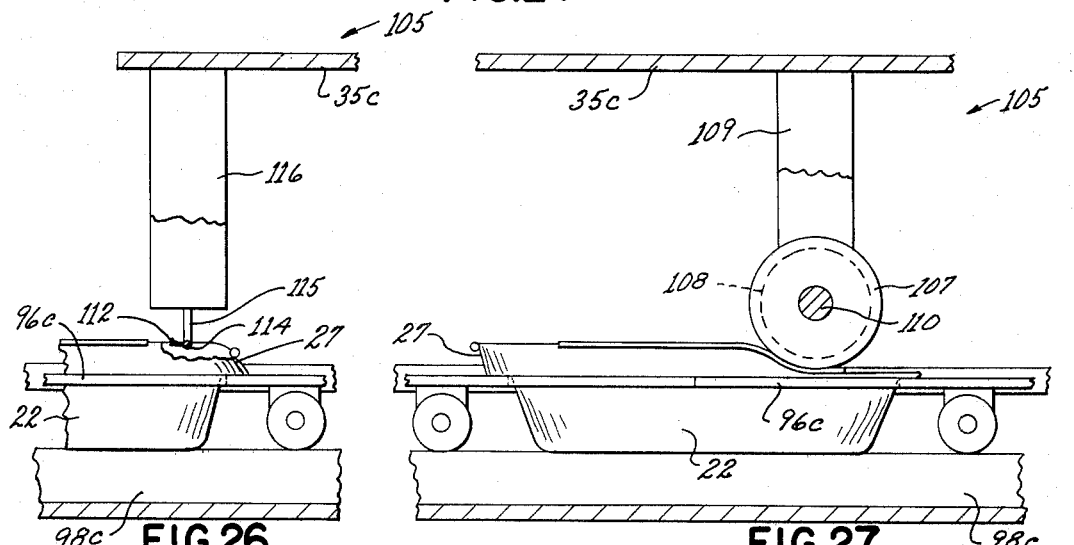
FIGURE 26 is a fragmentary, schematic, side view of part of the apparatus illustrated in FIGURE 24.
FIGURE 27 is a view similar to FIGURE 26 illustrating other parts of the apparatus of FIGURE 24.

The apparatus 105 includes a knock down member 112 disposed in advance of the screw members 106 and 107 as illustrated in FIGURES 24 and 26, the knock down member 112 comprising a substantially U-shaped rod or bar having the cross member 114 thereof disposed substantially horizontally and the legs 115 thereof secured to and depending from support means 116 as illustrated in FIGURE 26.

The cross member 114 of the knock down member 112 is so disposed relative to the track means 98c that the same is adapted to bend inwardly the leading portion of the peripheral flange 27 of each container 22 as the container 22 is conveyed from the left to the right in a straight line through the apparatus 105 by the conveyor plates 96c.

In this manner, the leading portion of the peripheral flanges 27 of the containers 22 are bent inwardly over their assembled cover members 20 before the respective container members 22 reach the screw means 106 and 107 which operate in a manner hereinafter described.

As illustrated in FIGURE 24, it can be seen that the knock down means 112 is disposed inboard of the side portions of the peripheral flange 27 of each container 22 whereby the knock down means 112 will not interfere with the normal vertical position of the side portions of the peripheral flanges 27 of the containers 22 as the containers 22 pass beyond the knock down means 112 while moving to the right to the rotating screw members 106 and 107.

As each container 22 moves from the left to the right past the knock down means 112 to the rotating screw members 106 and 107, the threads 111 of the rotating screw members 106 and 107 progressively bend inwardly the leading portion and the side portions of the peripheral flanges 27 of the containers 22 in the manner illustrated in FIGURES 24, 25 and 27 to bend inwardly the peripheral flanges 27 over the assembled cover members 20.

As the trailing portions of the peripheral flanges 27 of the containers 22 pass under the rotating screw means 106 and 107, the rotating screw members 106 and 107 also bend inwardly the trailing portion of the peripheral flanges 27 of the containers 22 even though the trailing portion of the peripheral flanges 27 of the containers 22 have been bent slightly backwardly by the knock down means 112.

After the containers 22 pass through the rotating screw members 106 and 107, the same pass under the roller means 87c which completes the bending inwardly of the peripheral flanges 27 over the assembled cover members 20 in the manner previously described.

The roller means 87c in addition to its function of providing a final fold for the peripheral flanges 27 of the containers 22 is provided with a pair of annular grooves 93c to receive the side bead 30 of the containers 22 to prevent flattening thereof.

Therefore, it can be seen that the apparatus 105 of this invention is also adapted to bend inwardly a peripheral flange of a container over its assembled cover member while the container and its assembled cover member is continuously moving in a straight line through the apparatus of this invention.

Accordingly, it can be seen that this invention provides improved methods and apparatus for securing a cover member to a container by bending inwardly a continuous peripheral flange of the container over the cover member while the assembled container and cover member are continuously moving in a particular direction.

While the form of the invention now preferred has been disclosed as required by the statutes, other forms may be used, all coming within the scope of the claims which follow.

What is claimed is:

1. Apparatus for folding inwardly a continuous upstanding peripheral flange of a container over a cover member or the like disposed substantially perpendicular to said flange and assembled to said container comprising means for continuously moving said container and assembled cover member in one direction from one point to another point, and means intermediate said points for folding inwardly said peripheral flange of said container over said cover member while said container is continuously moving in said one direction.

2. Apparatus as set forth in claim 1 and including means for continuously feeding containers to said first-named means at said one point.

3. Apparatus as set forth in claim 1 and including means for continuously removing said containers from said first-named means at said other point.

4. Apparatus as set forth in claim 1 wherein said first-named means is an endless conveyor means.

5. Apparatus for folding inwardly a continuous upstanding peripheral flange of a container over a cover member or the like disposed substantially perpendicular to said flange and assembled to said container comprising means for continuously moving said container and assembled cover member in one direction from one point to another point, first means intermediate said points for bending inwardly at least the trailing portion of said peripheral flange while said container is continuously moving in said one direction, and second means intermediate said first means and said other point for bending inwardly the remainder of said peripheral flange while said container is continuously moving in said one direction.

6. Apparatus for folding inwardly a continuous upstanding peripheral flange of a container over a cover member or the like disposed substantially perpendicular to said flange and assembled to said container comprising a rotatable member for bending inwardly at least the trailing portion of said peripheral flange, conveyor means for continuously moving said container and assembled cover member in one direction from one point to another point past said rotatable member, said conveyor means also moving said container and assembled cover member toward said rotatable member after the leading portion of said peripheral edge has passed said rotatable member to permit said rotatable member to bend inwardly at least the trailing portion of said peripheral flange, and means intermediate said rotatable member and said other point for bending inwardly the remainder of said peripheral flange while said container is continuously moving in said one direction.

7. Apparatus for folding inwardly a continuous upstanding peripheral flange of a container over a cover member or the like disposed substantially perpendicular to said flange and assembled to said container comprising a rotatable member for bending inwardly at least the trailing portion of said peripheral flange, conveyor means for continuously moving said container and assembled cover member in one direction from one point to another point past said rotatable member, said conveyor means also moving said container and said assembled cover member towards the rotatable member after the leading portion of said peripheral edge has passed said rotatable member to permit said rotatable member to bend inwardly at least the trailing portion of said peripheral flange, and means intermediate said rotatable member and said other point for bending inwardly the remainder of said peripheral flange while said container is continuously moving in said one direction, said conveyor means including two pairs of tracks, each pair of tracks having raised portions to move said container toward said rotatable member.

8. Apparatus for folding inwardly a continuous upstanding peripheral flange of a container over a cover member or the like disposed substantially perpendicular to said flange and assembled to said container comprising conveyor means for continuously moving said container and assembled cover member in one direction from one point to another point, a first folding means intermediate said points for bending inwardly the trailing portion of said peripheral flange while said container is continuously moving in said one direction, a second folding means intermediate said first folding means and said other point for bending inwardly the remainder of said peripheral flange while said container is continuously moving in said one direction, and a third folding means intermediate said second folding means and said other point for completing the folding inwardly of said peripheral flange while said container is continuously moving in said one direction.

9. Apparatus for folding inwardly a continuous upstanding peripheral flange of a container over a cover member or the like disposed substantially perpendicular to said flange and assembled to said container comprising conveyor means for continuously moving said container and assembled cover member in one direction from one point to another point, a first rotatable means intermediate said points for bending inwardly the trailing portion of said peripheral flange while said container is continuously moving in said one direction, a second rotatable means intermediate said first rotatable means and said other point for bending inwardly the remainder of said peripheral flange while said container is continuously moving in said said one direction, and a third rotatable means intermediate said second rotatable means and said other point for completing the folding inwardly of said peripheral flange while said container is continuously moving in said one direction.

10. Apparatus for folding inwardly a continuous upstanding peripheral flange of a container over a cover member or the like disposed substantially perpendicular to said flange and assembled to said container comprising conveyor means for continuously moving said container and assembled cover member in one direction from one point to another point, a first rotatable means intermediate said points for bending inwardly the trailing portion of said peripheral flange while said container is continuously moving in one direction, second rotatable means intermediate said first rotatable means and said other point for bending inwardly the remainder of said peripheral flange while said container is continuously moving in said one direction, and a third rotatable means intermediate said second rotatable means and said other point for completing the folding inwardly of said peripheral flange while said container is continuously moving in said one direction, said conveyor means including a plurality of plate-like members each having a cavity to receive a container.

11. Apparatus for folding inwardly a continuous upstanding peripheral flange of a container over a cover member or the like disposed substantially perpendicular to said flange and assembled to said container comprising conveyor means for continuously moving said container and assembled cover member in one direction from one point to another point, a first rotatable means intermediate said points for bending inwardly the trailing portion of said peripheral flange while said container is continuously moving in said one direction, a second rotatable means intermediate said first rotatable means and said other point for bending inwardly the remainder of said peripheral flange while said container is continuously moving in said one direction, and a third rotatable means intermediate said second rotatable means and said other point for completing the folding inwardly of said peripheral flange while said container is continuously moving in said one direction, said conveyor means including a plurality of H-shaped plate-like members, each pair of adjacent plate-like members defining a cavity therebetween to receive a container.

12. Apparatus as set forth in claim 9 wherein said conveyor means is continuous.

13. Apparatus for folding inwardly a continuously upstanding peripheral flange of a container over a cover member or the like disposed substantially perpendicular to said flange and assembled to said container comprising conveyor means for continuously moving said container and assembled cover member in one direction from one point to another point, a first rotatable means intermediate said points for bending inwardly the trailing portion of said peripheral flange while said container is continuously moving in said one direction, a second rotatable means intermediate said first rotatable means and said other point for bending inwardly the remainder of said peripheral flange while said container is continuously moving in said one direction, and a third rotatable means intermediate said second rotatable means and said other point for completing the folding inwardly of said peripheral flange while said container is continuously moving in said one direction, said first rotatable means including a paddle wheel-like member.

14. Aparatus for folding inwardly a continuously upstanding peripheral flange of a container over a cover member or the like disposed substantially perpendicular to said flange and assembled to said container comprising conveyor means for continuously moving said container and assembled cover member in one direction from one point to another point, a first rotatable means intermediate said points for bending inwardly the trailing portion of said peripheral flange while said container is continuously moving in said one direction, a second rotatable means intermediate said first rotatable means and said other point to bend inwardly the remainder of said peripheral flange while said container is continuously moving in said one direction, a third rotatable means intermediate said second rotatable means and said other point for completing the folding inwardly of said peripheral flange while said container is continuously moving in said one direction, said first rotatable means including a paddle wheel-like member, each paddle comprising a plurality of fingers.

15. Apparatus as set forth in claim 9 wherein said second rotatable means comprises two rollers.

16. Apparatus as set forth in claim 9 wherein said second rotatable means comprises two rollers having their axes converging.

17. Apparatus as set forth in claim 9 wherein said second rotatable means comprises two rollers having their axes converging toward the center of said container and angularly disposed relative to the direction of movement of said container.

18. Apparatus as set forth in claim 9 wherein said third rotatable means comprises a roller.

19. Apparatus as set forth in claim 9 wherein said third rotatable means comprises a roller having end portions of larger diameter than the intermediate portion thereof.

20. Apparatus as set forth in claim 9 wherein said third rotatable means comprises a segmented roller.

21. Apparatus for folding inwardly a continuously upstanding peripheral flange of a container over a cover member or the like disposed substantially perpendicular to said flange and assembled to said container comprising conveyor means for continuously moving said container and said assembled member in one direction from one point to another point, a first rotatable means intermediate said points for bending inwardly the trailing portion of said peripheral flange while said container is continuously moving in said one direction, a second rotatable means intermediate said first rotatable means and said other point for bending inwardly the remainder of said peripheral flange while said container is continuously moving in said one direction, and a third rotatable means intermediate said second rotatable means and said other point for completing the folding inwardly of said peripheral flange while said container is continuously moving in said one direction, said third rotatable means comprising a roller having a pair of annular grooves adapted to receive beads on said container.

22. Apparatus for folding inwardly a continuous upstanding peripheral flange of a container over a cover member or the like disposed substantially perpendicular to said flange and assembled to said container comprising conveyor means for continuously moving said container and assembled cover member in one direction from one point to another point, a first rotatable means intermediate said points for bending inwardly the trailing portion of said peripheral flange while said container is continuously moving in said one direction, a second rotatable means intermediate said first rotatable means and said other point for bending inwardly the remainder of said peripheral flange while said container is continuously moving in said one direction, and a third rotatable means intermediate said second rotatable means and said other point for completing the folding inwardly of said peripheral flange while said container is continuously moving in said one direction, said third rotatable means comprising a roller having means to groove part of said peripheral flange of said container.

23. Apparatus as set forth in claim 9 wherein said rotatable means are driven by the same power source.

24. A method for folding inwardly a continuous upstanding peripheral flange of a container over a cover member or the like disposed substantially perpendicular to said flange and assembled to said container comprising the steps of continuously moving said container and assembled cover member in one direction from one point to another, and folding inwardly said peripheral flange of said container over said cover member while said container is continuously moving in said one direction.

25. A method as set forth in claim 24 and including the step of grooving said peripheral flange and said cover member.

26. A method for folding inwardly a continuous upstanding peripheral flange of a container over a cover member or the like disposed substantially perpendicular to said flange and assembled to said container comprising the steps of continuously moving said container and assembled cover member in one direction from one point to another point, first bending inwardly at least the trailing portion of said peripheral flange intermediate said points while said container is continuously moving in said one direction, and, thereafter, bending inwardly the remainder of said peripheral flange while said container is continuously moving in said one direction.

27. A method for folding inwardly a continuous upstanding perpipheral flange of a container over a cover member or the like disposed substantially perpendicular to said flange and assembled to said container comprising the steps of continuously moving said container and assembled cover member on conveyor means in one direction from one point to another point, moving said container transversely relative to said one direction while said container is moving in said one direction, first bending inwardly the trailing portion of said peripheral flange intermediate said points after said container is moved transversely and is moving in said one direction, and, thereafter, bending inwardly the remainder of said peripheral flange while said container is continuously moving in said one direction.

28. A method as set forth in claim 27 and including the step of continuously feeding containers to said conveyor means at said one point.

29. A method as set forth in claim 27 and including the step of continuously removing said containers from said conveyor means at said other point.

30. A method for folding inwardly a continuous upstanding peripheral flange of a container over a cover member or the like disposed substantially perpendicular to said flange and assembled to said container comprising the steps of continuously moving said container and assembled cover member in one direction from one point to another point, bending inwardly the trailing portion of said peripheral flange at a first point intermediate said points while said container is continuously moving in said one direction, bending inwardly the remainder of said perpheral flange at a second point intermediate said first point and said other point while said container is continuously moving in said one direction, and completing the bending inwardly of said peripheral flange at a third point intermediate said second point and said other point while said container is continuously moving in said one direction.

31. A method for folding inwardly a continuous upstanding peripheral flange of a container over a cover member or the like disposed substantially perpendicular to said flange and assembled to said container comprising the steps of continuously moving said container and assembled cover member in one direction from one point to another point, rotating a first means at a first point intermediate said points to bend inwardly the trailing portion of said peripheral flange while said container is continuously moving in said one direction, rotating a second means at a second point intermediate said first point and said other point to bend inwardly the remainder of said peripheral flange while said container is continuously moving in said one direction, and rotating a third means at a third point intermediate said second point and said other point to complete the bending in of said peripheral flange while said container is continuously moving in said one direction.

32. Apparatus for folding inwardly a continuous upstanding peripheral flange of a container over a cover member or the like disposed substantially perpendicular to said flange and assembled to said container comprising means for continuously moving said container and assembled cover member in one direction from one point to another point, and rotating means intermediate said points for folding inwardly said peripheral flange of said container over said cover member while said container is continuously moving in said one direction.

33. Apparatus for folding inwardly a continuously upstanding peripheral flange of a container over a cover member or the like disposed substantially perpendicular to said flange and assembled to said container comprising means for continuously moving said container and assembled cover member from one point to another point, and rotating means intermediate said points for folding inwardly said peripheral flange of said container over said cover member while said container is continuously moving in said one direction, said rotating means including a rotating paddle wheel for bending inwardly at least the trailing portion of said peripheral flange.

34. Apparatus for folding inwardly a continuous upstanding peripheral flange of a container over a cover member or the like disposed substantially perpendicular to said flange and assembled to said container comprising means for continuously moving said container and assembled cover member in one direction from one point to another point, and rotating means intermediate said points for folding inwardly said peripheral flange of said container over said cover member while said container is continuously moving in said one direction, said rotating means including a rotating paddle wheel for bending inwardly at least the trailing portion of said peripheral flange, said rotating paddle wheel reciprocating transversely relative to the direction of travel of said container.

35. Apparatus for folding inwardly a continuous upstanding peripheral flange of a container over a cover member or the like disposed substantially perpendicular to said flange and assembled to said container comprising means for continuously moving said container and assembled cover member in one direction from one point to another point, and rotating means intermediate said points for folding inwardly said peripheral flange of said container over said cover member while said container is continuously moving in said one direction, said rotating means including a rotating paddle wheel for bending inwardly at least the trailing portion of said peripheral flange, said rotating paddle wheel orbiting relative to the direction of travel of said container.

36. Apparatus for folding inwardly a continuous upstanding peripheral flange of a container over a cover member or the like disposed substantially perpendicular to said flange and assembled to said container comprising means for continuously moving said container and assembled cover member in one direction from one point to another point, and rotating means intermediate said points for folding inwardly said peripheral flange of said container over said cover member while said container is continuously moving in said one direction, said rotating means including a pair of rotating screw members that bend inwardly at least part of said peripheral flange.

37. Apparatus as set forth in claim 32, wherein said rotating means reciprocates transversely relative to the direction of travel of said container.

38. Apparatus as set forth in claim 32 wherein said rotating means moves in an orbit relative to the direction of travel of said container.

39. Apparatus for folding inwardly a continuous upstanding peripheral flange of a container over a cover member or the like disposed substantially perpendicular to said flange and assembled to said container comprising means for continuously moving said container and assembled cover member in one direction from one point to another point, and rotating means intermediate said points for bending inwardly at least the trailing portion of said peripheral flange while said container is moving in said direction, said rotating means moving away from said container to permit the leading portion of said peripheral flange to pass said rotating means and, thereafter, moving toward said container to bend said trailing portion of said flange.

40. Apparatus as set forth in claim 39 wherein said conveying means includes means for moving said container in a straight line from said one point to said other point.

41. Apparatus as set forth in claim 39 wherein said conveying means includes means for moving said container transversely relative to said rotating means while moving said container from said one point to said other point.

42. Apparatus for folding inwardly a continuous upstanding peripheral flange of a container over a cover member or the like disposed substantially perpendicular to said flange and assembled to said container comprising means for continuously moving said container and assembled cover member in one direction from one point to another point, and rotating means intermediate said points for bending inwardly said peripheral flange while said container is moving in said direction, said rotating means including a pair of rotating screw members that first bend in the leading portion of said peripheral flange, then the opposed side portions of said peripheral flange and, thereafter, the trailing portion of said peripheral flange.

43. Apparatus as set forth in claim 42 wherein said screw members are coaxially aligned.

44. Apparatus as set forth in claim 42 wherein each screw member has the threads thereof progressively move inwardly as said screw member rotates.

45. A method for folding inwardly a continuous upstanding peripheral flange of a container over a cover member or the like disposed substantially perpendicular to said flange and assembled to said container comprising the steps of continuously moving said container and assembled cover member in one direction from one point to another point, and folding inwardly said peripheral flange of said container over said cover member while said container is continuously moving in said one direction.

46. A method for folding inwardly a continuous upstanding peripheral flange of a container over a cover member or the like disposed substantially perpendicular to said flange and assembled to said container comprising the steps of continuously moving said container and assembled cover member in one direction from one point to another point, moving rotating means away from said container to permit the leading portion of said peripheral flange to pass said rotating means, and, thereafter, moving said rotating means toward said container to bend inwardly at least the trailing portion of said peripheral flange while said container is moving in said direction.

47. A method as set forth in claim 46 wherein said conveying step includes the step of moving said container in a straight line from said one point to said other point.

48. A method as set forth in claim 46 wherein said conveying step includes the step of moving said container transversely relative to said rotating means while moving said container from said one point to said other point.

49. A method for folding inwardly a continuous upstanding peripheral flange of a container over a cover member or the like disposed substantially perpendicular to said flange and assembled to said container comprising the steps of continuously moving said container and assembled cover member in one direction from one point to another point, and first bending inwardly the leading portion of said peripheral flange, then the opposed side portions of said peripheral flange, and, thereafter, the trailing portion of said peripheral flange.

50. A method as set forth in claim 49 wherein said step of rotating said screw means includes the step of rotating each screw means so that the threads thereof progressively move inwardly.

51. Apparatus for folding inwardly a continuous upstanding peripheral flange of a container over a cover member or the like disposed substantially perpendicular to said flange and assembled to said container comprising means for continuously moving said container and assembled cover member in one direction from one point to another point, and rotating means intermediate said points for bending inwardly said peripheral flange while said container is moving in said direction, said rotating means including a pair of rotating screw members to provide an initial fold for said peripheral flange and a roller to provide a final fold for said peripheral flange, said roller being provided with a pair of annular grooves adapted to receive beads on said container.

52. Apparatus for folding inwardly a continuous upstanding peripheral flange of a container over a cover member or the like disposed substantially perpendicular to said flange and assembled to said container comprising means for continuously moving said container and assembled cover member in one direction from one point to another point, and rotating means intermediate said points for bending inwardly said peripheral flange while said container is moving in said direction, said rotating means including a pair of rotating screw members to provide an initial fold for said peripheral flange and a roller to provide a final fold for said peripheral flange.

53. Apparatus as set forth in claim 52 wherein said screw means rotates on coaxially aligned axes.

References Cited by the Examiner

UNITED STATES PATENTS

| | | | |
|---|---|---|---|
| 1,094,451 | 4/1914 | Martin | 53—375 X |
| 1,980,361 | 11/1934 | Spear | 53—287 X |
| 1,987,500 | 1/1935 | Wild | 53—374 |
| 2,265,024 | 12/1941 | Bickford | 53—287 |
| 2,942,395 | 6/1960 | Thoren | 53—316 |
| 2,975,574 | 3/1961 | Jorgenson et al. | 53—378 X |
| 2,982,073 | 5/1961 | Zimmerer | 53—366 |
| 3,018,594 | 1/1962 | Phillips et al. | 53—72 |

FRANK E. BAILEY, *Primary Examiner.*

TRAVIS S. McGEHEE, *Examiner.*

A. E. FOURNIER, R. L. FARRIS, *Assistant Examiners.*